(12) United States Patent
Schmid et al.

(10) Patent No.: US 8,412,094 B2
(45) Date of Patent: Apr. 2, 2013

(54) POSITION SIGNAL RECEIVER

(75) Inventors: Andreas Schmid, Duisburg (DE);
Stefan Van Waasen, Xanten (DE)

(73) Assignee: Intel Mobile Communications GmbH,
Neubiberg (DE)

( * ) Notice: Subject to any disclaimer, the term of this patent is extended or adjusted under 35 U.S.C. 154(b) by 186 days.

(21) Appl. No.: 12/816,304

(22) Filed: Jun. 15, 2010

(65) Prior Publication Data

US 2011/0306289 A1 Dec. 15, 2011

(51) Int. Cl.
*H04H 20/74* (2008.01)
(52) U.S. Cl. .................. 455/3.02; 455/404.2; 455/427; 455/456.1; 455/456.2; 455/456.3; 342/457
(58) Field of Classification Search .............. 455/3.02, 455/404.2, 427, 456.1, 456.2, 456.3; 342/457; 701/213
See application file for complete search history.

(56) References Cited

U.S. PATENT DOCUMENTS

| 5,774,829 | A | * | 6/1998 | Cisneros et al. | 701/475 |
| 5,883,594 | A | * | 3/1999 | Lau | 342/357.63 |
| 5,982,324 | A | * | 11/1999 | Watters et al. | 342/357.29 |
| 5,990,825 | A | * | 11/1999 | Ito | 342/357.31 |
| 6,289,279 | B1 | * | 9/2001 | Ito et al. | 701/469 |
| 7,154,437 | B2 | * | 12/2006 | Bromley et al. | 342/357.64 |
| 7,376,440 | B2 | * | 5/2008 | Forrester et al. | 455/553.1 |
| 2004/0072575 | A1 | * | 4/2004 | Young et al. | 455/456.1 |

* cited by examiner

*Primary Examiner* — Sanh Phu
(74) *Attorney, Agent, or Firm* — SpryIP, LLC

(57) ABSTRACT

Apparatuses are described and disclosed which operate in a first mode to receive non-position signals, for example FM radio signals, and in a second mode of operation to receive land-based position signals, for example LORAN signals.

25 Claims, 2 Drawing Sheets

POSITION SIGNAL RECEIVER

BACKGROUND

Position signals from satellite navigation systems are used in a wide range of applications to determine a position. The most widely used satellite navigation system is GPS (global positioning system), which has been established by the USA. Other satellite navigation systems include GLONASS, a satellite navigation system provided by Russia, Galileo, the satellite navigation system currently being built by the European Union and the European Space Agency, or Compass, a navigation system under development by China.

In particular, such position systems are increasingly used by mobile electronic devices like mobile phones or digital cameras to determine the position of the device.

However, positioning systems based on satellite navigation position signals may only provide limited service availability in urban and indoor environments due to attenuation, shadowing and multipath fading effects in urban canyons and indoor areas. This is at least partially due to the frequency range used by such systems which is rather effectively attenuated by walls, buildings and the like.

A general alternative to satellite-based navigation and position determination is land-based navigation and position determination. For example, before the implementation of GPS, marine positioning receivers in ships were often based upon LORAN (long range navigation). LORAN is a world wide terrestrial navigation system using low frequency radio transmissions. Somewhat similar to GPS, it uses multiple transmitters to determine the location and speed of a user via trilateration. The most common LORAN variant is LORAN-C which transmits short pulses at a frequency of approximately 100 kHz in certain intervals. LORAN-C transmitter stations are usually ground-based and equipped with antennas about 411 m high which have transmit powers up to 4 MW. Many nations are users of the system, including European nations, the USA, Canada, Japan, China, India and several Middle Eastern countries. Russia uses a nearly identical system in the same frequency range, called CHAYKA, which is compatible to LORAN-C as it also transmits short 100 kHz pulses.

Various enhancements like E-LORAN (enhanced LORAN) allow for an accuracy of up to 8 m, which makes it a possible substitute for GPS in environments where receiving GPS or other satellite navigation position signals is difficult.

However, additionally integrating a separate receiver for such LORAN signals in mobile electronic devices or other devices may be undesirable as additional components, chip areas, antennas and the like may be needed.

DETAILED DESCRIPTION OF THE INVENTION

Figure 1:
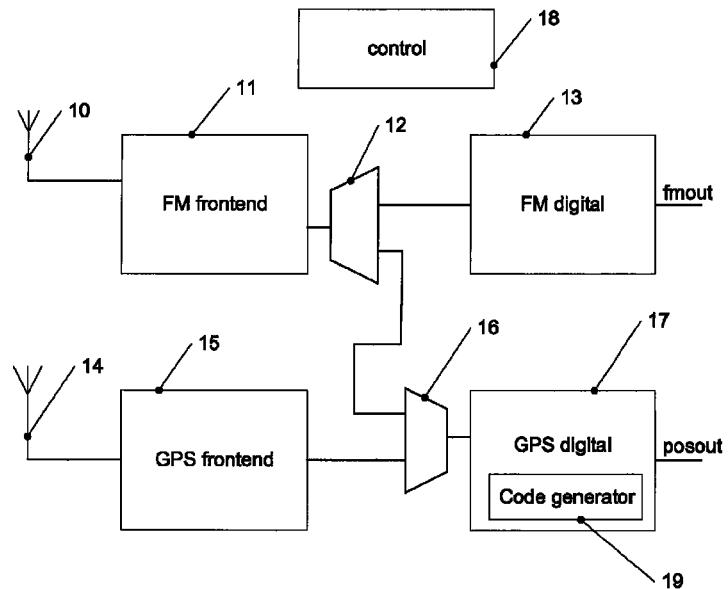
FIG. 1 shows a block diagram of an apparatus according to an embodiment.

In the following, some embodiments of the present invention will be described in detail. It is to be understood that the following description is given only for purpose of illustration and is not to be taken in a limiting sense. The scope of the invention is not intended to be limited by the embodiments described hereinafter with reference to the accompanying drawings, but is intended to be limited only by the appended claims and equivalents thereof.

It is also to be understood that in the following description of embodiments any direct connection or coupling between functional blocks, devices, components, circuits or other physical or functional units shown in the drawings or described herein could also be implemented by an indirect connection or coupling, i.e. a connection or coupling comprising one or more intervening elements. Furthermore, it should be appreciated that functional blocks or units shown in the drawings may be implemented as separate circuits in some embodiments, but may also be fully or partially implemented in a common circuit in other embodiments. For example, several functional blocks shown may be implemented in a single system on chip (SoC) or system in package (SiP).

It should be noted that the drawings are provided to give an illustration of some aspects of embodiments of the present invention and are therefore to be regarded as schematic only. In particular, the elements shown in the drawings are not necessarily to scale with each other, and the placement of various elements in the drawings is chosen to provide a clear understanding of the respective embodiment and is not to be construed as necessarily being a representation of the actual relative locations of the various components shown. On the other hand, a single functional block may be implemented by a plurality of circuits in other embodiments.

The features of the various embodiments described herein may be combined with each other unless specifically noted otherwise. On the other hand, describing an embodiment with a plurality of features is not to be construed as indicating that all these features are necessary for practicing the present invention, as other embodiments may comprise less features and/or alternative features.

Some of the following embodiments relate to receiving position signals. Position signals are any signals which allow a device receiving the signals to determine its position. The accuracy of this determination may depend on the type of signals used.

Position signals may for example be satellite-based position signals or land-based position signals. Satellite position signals are sent from a satellite and include for example GPS signals, Galileo signals, GLONASS signals or Compass signals. Land-based position signals are sent from transmitters at or near the earth surface and include LORAN, LORAN-C, EUROFIX, CHAYKA or E-LORAN signals.

In some embodiments, an apparatus comprises a satellite position signal receiver frontend and a satellite receiver digital portion coupled to this satellite position signal receiver frontend. The apparatus may further comprise a further wireless signal receiver frontend. The further wireless signal receiver frontend may be operated in a first mode to receive non-position signals, for example FM radio signals, Bluetooth signals, W-LAN signals, GSM signals or UMTS signals as well as other communication signals or a second mode of operation where the further wireless signal receiver frontend is configured to receive land-based position signals. In the first mode, the further wireless signal receiver frontend may be coupled to a wireless digital portion, whereas in the second mode the further wireless signal receiver frontend is coupled to the satellite receiver digital portion. The satellite receiver portion may comprise a code generator to decode land-based position signals.

In other words, in such embodiments a single frontend, namely the further wireless signal receiver frontend, is used both for receiving non-position wireless signals for other applications as well as land-based position signals. Therefore, in such embodiments only little extra circuitry is needed for receiving land-based position signals.

An example for such an embodiment will now be described with reference to FIG. 1. In the embodiment of FIG. 1, GPS is used as an example for a satellite navigation system, and FM (frequency modulation) radio signals are used as an example for non-position wireless signals.

An apparatus shown in FIG. 1 comprises an antenna 10 to receive FM radio signals. Such an antenna may for example be formed by wires of earphones or a headset of a mobile electronic device like a mobile phone. Antenna 10 is coupled with an FM frontend 11 which performs an analog processing of signals received via antenna 10. The analog processing may for example comprise an amplification, a frequency downconversion by mixing, a filtering and/or an analog-to-digital conversion.

An output of FM frontend 11 is coupled with a multiplexer 12. When the apparatus of FIG. 1 and in particular FM frontend 11 are in a first mode of operation for receiving FM signals, for example for listening to a radio station, multiplexer 12 forwards a signal output from FM frontend 11 to an FM digital portion 13 which further processes the signals and outputs them as digital signals fmout. Furthermore, the apparatus of FIG. 1 comprises a GPS antenna 14 for receiving GPS signals and a GPS frontend 15 coupled to GPS antenna 14. GPS frontend 15 comprises analog circuitry for processing signals received from GPS antenna 14, for example an amplifier to amplify the signals, a filter to filter the signals and/or an analog-to-digital converter. Any conventional GPS frontend circuitry may be used.

An output of GPS frontend 15 is coupled with an input of a multiplexer 16. When GPS position signals are received, multiplexer 16 couples the output of GPS frontend 15 with a GPS digital portion 17 which digitally processes the received signals, for example performs a despreading operation to retrieve the information contained in the GPS signal. In this respect, GPS digital portion 17 may work like any conventional GPS receiver digital portion. The result is output as a signal posout.

In a second mode of operation which may for example be activated by a control 18 when a user of the apparatus wants to determine his or her position and the GPS signals received via GPS antenna 14 e.g. may not be sufficient to determine the position (for example indoors when attenuation is so great that virtually no signals are received), the apparatus of FIG. 1 is configured to receive and process land-based position signals. In the second mode of operation, FM frontend 11 is configured, for example based on a control signal received from control 18, to process land-based position signals received via antenna 10 and to output the processed signals to multiplexer 12. In the second mode, multiplexer 12 is set to output the signals received from FM frontend 11 to multiplexer 16. Multiplexer 16 in the second mode is set to forward the signals received from multiplexer 12 to GPS digital portion 17. GPS digital portion 17 in the second mode then processes, for example decodes, the land-based position signals. To this end, a code generator 19 may be provided in GPS digital portion 17 which provides codes to decode, for example despread, the land-based position signals. The land-based position signals may for example be LORAN signals or similar signals.

For example, code generator 19 in this case may generate codes having a code length of 200-300 ms. Correspondingly, an integration period used for despreading in GPS digital portion 17 in the second mode of operation can then be modified to be 200-300 ms to match the code period of code generator 19. Code generator 19 in particular may be an extra code generator in addition to a code generator conventionally used in GPS digital portions to despread GPS signals.

When receiving land-based position signals, the identification of the different transmitters is accomplished by measuring delays between detected pulses. A timing relationship between the different transmitters received is then used in a similar way for trilateration as used for satellite-based navigation, and the same processing units can be used. In particular, land-based transmitters like LORAN-C, EUROFIX, CHAYKA or E-LORAN are equipped with atomic clocks just like satellite navigation systems, such said similar synchronized transition occurs and the time delay of reception is a measure for the time difference of arrival used for trilateration.

Figure 2A:
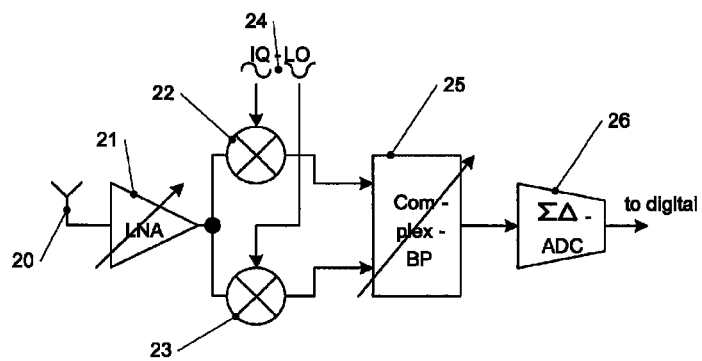
FIG. 2A shows a diagram of a frontend according to an embodiment in a first mode of operation.
Figure 2B:
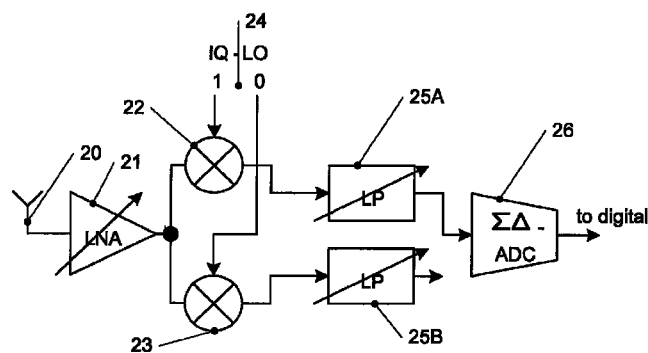
FIG. 2B shows the frontend of FIG. 2A in a second mode of operation.

Next, an example implementation of a frontend according to an embodiment which is switchable between a first mode and a second mode will be explained with reference to FIGS. 2A and 2B. The frontend shown in FIGS. 2A and 2B may for example be used as FM frontend 11 in the embodiment of FIG. 1, but may also be used in other environments. FIG. 2A shows the frontend operating in a first mode, for example in a mode to receive FM radio signals, and FIG. 2B shows the frontend operating in a second mode, for example to receive land-based positioning signals like LORAN signals. First, the frontend operating the first mode as shown in FIG. 2A will be described.

The frontend of FIG. 2A receives signals received via an antenna 20, for example FM radio signals, at a low noise amplifier (LNA) 21. The received signal is then frequency downconverted e.g. to a baseband frequency by mixers 22, 23. In particular, an output of low noise amplifier 21 is connected to a first input of mixer 22 and to a first input of mixer 23. A second input of mixer 22 and a second input of mixer 23 is coupled with a local oscillator 24. As schematically shown in FIG. 2A, the signal supplied from local oscillator 24 to mixer 23 is phase shifted by 90 degrees compared to the signal supplied to mixer 22, to generate two orthogonal components, commonly referred to as I-component and Q-component.

The signals output by mixers 22, 23 are fed to a complex adjustable bandpass filter 25 to generate a filtered signal, which is then fed to an analog-to-digital converter 26. Through the mixing with the local oscillator signal and the subsequent filtering, the signal output by the low noise amplifier 21 is downconverted to a lower frequency, for example a baseband frequency. Analog-to-digital converter 26 may be an analog-to-digital converter (ADC) with high bandwidth and/or high dynamic range and may for example be implemented as a sigma-delta ($\Sigma\Delta$) analog-to-digital converter. A digital output from analog-to-digital converter 26 is then forwarded to digital processing circuitry, for example FM digital portion of FIG. 1. In this mode of operation, the frontend shown in FIG. 2A essentially corresponds to a conventional FM frontend.

In FIG. 2B, the frontend operating in a second mode to receive land-based position signals, for example LORAN signals, is shown. Such LORAN signals have a frequency below the typical frequencies of FM radio signals for example 100 kHz compared to about 70-110 MHz for FM radio signals.

Again, the signals are received via antenna 20 and fed to low noise amplifier 21. In order to be able to amplify the LORAN signals, the lower corner frequency of the low noise amplifier 21 has to be chosen accordingly. For example, the frequency can be extended down to a needed range by using an appropriate external capacitance instead of an internal capacitance if the lower corner frequency is dependent on a corresponding AC-coupling.

Furthermore, in the second mode of operation, a constant signal with a value 1 is fed to mixer 22, and a constant signal with a value 0 is fed to mixer 23. In other words, mixer 22 is essentially set to a bypassing mode, as mixing with a constant 1 leaves the signal unchanged. Mixer 23 is effectively deactivated, as mixing with 0 yields an output signal of 0.

The complex bandpass filter 25 is then adjusted to function as low pass filters 25A, 25B (where 25B need not be implemented as it is effectively not used). This switching into a low pass mode can for example be accomplished by switching out a resistor or a switch capacitor/resistor configuration of complex bandpass filter 25. Furthermore, if there is a structure with coils in place in bandpass filter 25 to generate a bandpass characteristic, this structure with coils may be deactivated or bypassed in the second mode to receive land-based position signals. The signal output by low pass filter 25A is then digitized by analog-to-digital converter 26 and forwarded to a digital portion, for example GPS digital portion of FIG. 1. Therefore, in the embodiment shown existing filtering and PGA (programmable gain amplifier)/AGC (automatic gain control) circuitry like low noise amplifier 21 and filter 25 as well as analog-to-digital converter 26 is used both for receiving FM signals and for receiving land-based position signals.

It should be noted that the modifications described above for switching between the first mode and the second mode of operation of the FM frontend shown in FIGS. 2A, 2B are merely an example, and depending on the circuitry used in a particular implementation other modifications may be additionally or alternatively performed, or some modifications described above may be omitted. For example, instead of modifying complex bandpass filters 25 to act as low pass filters 25A, 25B, a parallel additional filter path may be used. Also, while the same antenna is used in FIGS. 2A and 2B, for example an antenna formed by a wire of head phones of a mobile device, in other embodiments separate antennas may be used. For example, a separate specific ferrite antenna may be used for receipt of land-based position signals like LORAN signals.

In case instead of bandpass filter 25 low pass filters are provided, in some embodiments no modification may be necessary.

In the embodiment of FIG. 2B, the output of the analog-to-digital converter 26 resembles a direct-RF sampling of the land-based position signal. In the embodiment shown, this is possible because of the comparatively low signal frequency of about 100 kHz of such land-based position signals in combination with significantly higher sampling rates typically used in modern frontends.

Figure 3:
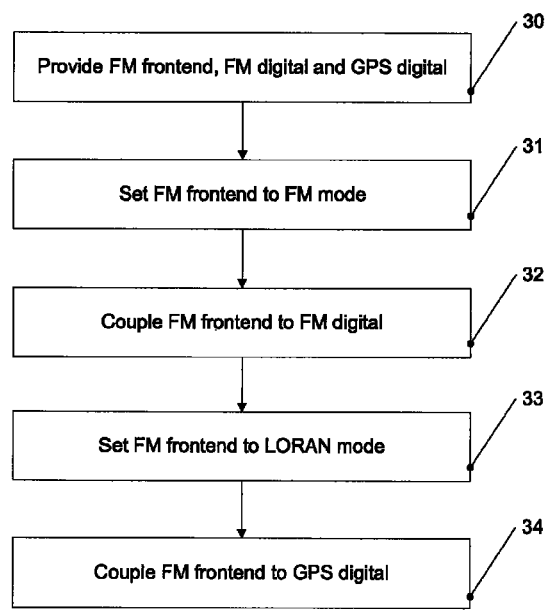
FIG. 3 shows a flow diagram illustrating a method according to an embodiment.

Turning now to FIG. 3, an embodiment of a method will be described. While the method of FIG. 3 is described as a series of operations, it is to be emphasized that the operations may be performed in a different order to the one shown.

At 30, an FM frontend, an FM digital portion and a GPS digital portion are provided.

At 31, the FM frontend is set to a first mode of operation to receive FM signals. At 32, the FM frontend is coupled to the FM digital portion such that the FM signals received by the FM frontend are processed by the FM digital portion.

At 33, the FM frontend is switched to a second mode. At 34, the FM frontend is coupled to the GPS digital portion such that in the second mode the FM frontend receives land-based position signals and forwards them to the GPS digital portion, where they are processed.

The method described above may be implemented in the embodiments of FIGS. 1 and/or 2, but may also be implemented independently therefrom.

In the embodiment of FIG. 1, while the reception of land-based position signals may be used as an alternative to receiving GPS signals, in other embodiments a regular switch may be performed between the modes, and the information from the satellite position signals and land-based position signals may be combined to enhance the position accuracy.

While in the embodiments above an FM frontend which can be switched to a second mode for receiving land-based position signals has been described, in other embodiments other wireless signal receiver frontends switchable between a first mode and a second mode may be used. For example, instead of an FM frontend a Bluetooth frontend, a W-LAN (wireless LAN) frontend, or a frontend for a cellular wireless standard like GSM or UMTS may be used as a basis to receive the corresponding signals like communication or broadcast signals in the first mode, e.g. Bluetooth signals, W-LAN signals or cellular wireless signals and be modified to receive land-based position signals in a second mode.

Furthermore, while in the embodiments above GPS signals have been used as examples for satellite-based navigation signals and LORAN signals have been used as examples for land-based position signals, in other embodiments other satellite-based navigation signals like Galileo signals, GLONASS signals or Compass signals may be used, and/or other land-based common position signals like LORAN-C, EUROFIX, CHAYKA and E-LORAN may be used.

Multiplexers 12, 16 are merely only one example for switching circuitry to selectively couple the output of FM frontend 11 with FM digital portion 13 or GPS digital portion 17, and other types of switching circuitry, for example based on one or more switches, may also be used.

In view of the many possibilities for modifications and variations discussed above, it is to be emphasized that the scope of the present application is not to be construed as being limited to the embodiments described above.

What is claimed is:

1. An apparatus, comprising:
    a wireless signal receiver frontend,
    a digital non-position signal processing portion,
    a digital position signal processing portion, and
    switching circuitry configured to couple an output of said frontend with an input of said digital non-position signal processing portion in a first mode of operation and to couple the output of the frontend with the digital position signal processing portion in a second mode of operation,
    wherein the wireless signal receiver frontend includes at least amplifying circuitry used both in the first mode of operation and in the second mode of operation of the frontend.

2. The apparatus of claim 1, wherein said switching circuitry comprises a multiplexer.

3. The apparatus of claim 1,
    wherein said frontend is operable in a first mode of operation to receive wireless non-position signals and in a second mode of operation to receive land-based position signals.

4. The apparatus of claim 3,
    wherein said land-based position signals comprise LORAN signals.

5. The apparatus of claim 3,
wherein said frontend further comprises filtering circuitry, at least a part of said filtering circuitry is used both in the first mode of operation and in the second mode of operation of the frontend.

6. The apparatus of claim 1,
wherein said digital non-position signal processing portion comprises a digital communication or broadcast signal processing portion.

7. The apparatus of claim 6,
wherein said digital communication or broadcast signal processing portion is a digital FM radio signal processing portion.

8. The apparatus of claim 1, further comprising a satellite position signal receiver frontend.

9. The apparatus of claim 8,
wherein said digital position signal processing portion in a first mode of operation is configured to process signals received by said satellite position signal receiver frontend and in a second mode of operation is configured to process land-based position signals received by said wireless signal receiver frontend.

10. The apparatus of claim 1,
wherein said digital position signal processing portion comprises a code generator to despread land-based position signals.

11. The apparatus of claim 1,
wherein the apparatus is implemented as a system on chip or as a system in package.

12. An apparatus, comprising:
an amplifier,
a mixer, a first input of said mixer being coupled with an output of said amplifier, and
a local oscillator,
wherein the apparatus is operable in a first mode to receive non-position signals and in a second mode to receive land-based position signals,
wherein in said first mode said local oscillator is coupled with a second input of said mixer, and
wherein in said second mode a constant signal is coupled with said second input of said mixer.

13. The apparatus of claim 12, further comprising a further mixer, wherein a first input of said further mixer is coupled with said output of said amplifier, wherein in said first mode said local oscillator is coupled with a second input of said further mixer, and
wherein in said second mode of operation a signal having a value of 0 is supplied to said second input of said further mixer.

14. The apparatus of claim 12,
further comprising a filter coupled to an output of said mixer.

15. The apparatus of claim 14,
wherein said filter in said first mode is operable as a complex bandpass filter.

16. The apparatus of claim 14,
wherein said filter is operable as a low pass filter in said second mode.

17. The apparatus of claim 14, further comprising an analog-to-digital converter, wherein an input of said analog-to-digital converter is coupled with an output of said filter.

18. The apparatus of claim 17,
wherein said analog-to-digital converter comprises a sigma-delta analog-to-digital converter.

19. The apparatus of claim 17, further comprising:
a digital non-position signal processing portion, and
a digital position signal processing portion, and
switching circuitry, wherein said switching circuitry is configured to couple an output of said analog-to-digital converter with said digital non-position signal processing portion in said first mode and to couple said output of said analog-to-digital converter with said digital position signal processing portion in said second mode.

20. A method, comprising:
providing a wireless communication frontend including at least a mixer,
providing a wireless communication digital portion,
providing a position signal processing digital portion,
setting the wireless communication frontend to a wireless communication mode,
coupling the wireless communication frontend to the wireless communication portion,
setting the wireless communication frontend to a land-based position signal mode, and
coupling the wireless communication frontend to the digital position signal processing portion.

21. The method of claim 20,
wherein said setting the wireless communication frontend to the land-based position signal mode comprises supplying a constant signal to the mixer.

22. The method of claim 20,
wherein said setting the wireless communication frontend to land-based position signal mode comprises setting a filter to a low pass filter mode.

23. The method of claim 20,
wherein said setting the wireless communication frontend to wireless communication mode comprises supplying a local oscillator signal to the mixer and setting a filter to a band pass mode.

24. The method of claim 20, further comprising receiving LORAN signals in said land-based position signal mode.

25. The method of claim 20,
wherein said wireless communication comprises one of receiving FM radio signals, Bluetooth communication, GSM communication, UMTS communication or wireless LAN communication.

* * * * *